US008301768B2

United States Patent
Pottenger (10) Patent No.: US 8,301,768 B2
(45) Date of Patent: *Oct. 30, 2012

(54) PEER-TO-PEER INDEXING-BASED MARKETPLACE

(76) Inventor: William M. Pottenger, Hellertown, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/317,134

(22) Filed: Dec. 19, 2008

(65) Prior Publication Data

US 2009/0177728 A1    Jul. 9, 2009

Related U.S. Application Data

(60) Provisional application No. 61/008,405, filed on Dec. 20, 2007.

(51) Int. Cl.
 G06F 15/173      (2006.01)
 G06F 7/00          (2006.01)
 G06F 17/00        (2006.01)

(52) U.S. Cl. .................. 709/225; 709/226; 707/673

(58) Field of Classification Search .................. None
 See application file for complete search history.

(56) References Cited

U.S. PATENT DOCUMENTS

| | | | |
|---|---|---|---|
| 6,901,398 B1 | 5/2005 | Horvitz et al. | |
| 7,016,908 B2 | 3/2006 | Kataoka et al. | |
| 7,117,437 B2* | 10/2006 | Chen et al. | 715/254 |
| 7,174,382 B2 | 2/2007 | Ramanathan et al. | |
| 7,328,216 B2 | 2/2008 | Hofmann et al. | |
| 7,337,181 B2 | 2/2008 | Horvitz | |
| 7,392,303 B2 | 6/2008 | Smith et al. | |
| 7,617,370 B2 | 11/2009 | Jernigan et al. | |
| 7,634,466 B2 | 12/2009 | Rose et al. | |
| 7,664,742 B2* | 2/2010 | Pettovello | 1/1 |
| 7,769,804 B2 | 8/2010 | Church et al. | |
| 2002/0069056 A1* | 6/2002 | Nofsinger | 704/235 |
| 2002/0078062 A1 | 6/2002 | Kataoka et al. | |
| 2003/0191828 A1* | 10/2003 | Ramanathan et al. | 709/221 |
| 2003/0236861 A1 | 12/2003 | Johnson et al. | |
| 2004/0024848 A1 | 2/2004 | Smith et al. | |
| 2006/0282309 A1* | 12/2006 | Zhang et al. | 705/14 |
| 2007/0168469 A1 | 7/2007 | Church et al. | |
| 2007/0211651 A1* | 9/2007 | Ahmed et al. | 370/256 |

(Continued)

OTHER PUBLICATIONS

USPTO Office Action; Sep. 28, 2010 in U.S. Appl. No. 12/317,153.

(Continued)

*Primary Examiner* — Krista Zele
*Assistant Examiner* — Azizul Choudhury
(74) *Attorney, Agent, or Firm* — Beverly W. Lubit; Greenburg Traurig, LLP (57) ABSTRACT

A data sharing and indexing system composed of multiple local indexing systems residing on network storage devices. Each (instantiation of the groupware) local storage device runs software for advanced content-based indexing, and each local indexing system forms a node in a peer-to-peer network. The indexing software performs topic-based categorization by means of a higher-order path analysis algorithm, which mimics human intuition by considering both high- and low-order links between data elements. The indexes generated by the software are automatically partitioned into topic indexes. The topical similarity of indexes to each other and to a pre-established set of topic indices is measured using a cross-training algorithm. The peer-to-peer network is implemented by a novel mesh-based, self-healing protocol, providing specialized means for sharing data and topic indexes. The software leverages the index sharing technology to provide content- and metadata-based searching features.

19 Claims, 8 Drawing Sheets

Indexing Module Diagram

U.S. PATENT DOCUMENTS

| | | | | |
|---|---|---|---|---|
| 2008/0080393 | A1* | 4/2008 | Kaler | 370/254 |
| 2009/0125637 | A1 | 5/2009 | Matuszewski | |
| 2009/0164475 | A1 | 6/2009 | Pottenger | |
| 2009/0177757 | A1 | 7/2009 | Pottenger | |

OTHER PUBLICATIONS

USPTO Office Action; Dec. 21, 2010 in U.S. Appl. No. 12/317,152.
Official Action issued in connection with U.S. Appl. No. 12/317,153 mailed Mar. 15, 2011.
Taskar, B. et al, "Discriminative Probabilistic Models for Relational Data", In Proceedings of Uncertainty in Artificial Intelligence Conference UAI02, Edmonton, Canada, 2002.
Getoor, L. et al., "Link Mining: A Survey", SIGKDD Explorations, vol. 7, No. 2, 2005, pp. 3-12.
Macskassy, S.A. et al., A Brief Survey of Machine Learning Methods for Classification in Networked Data and Application to Suspicion Scoring, Workshop on Statistical Network Analysis at 23rd International Conference on Machine Learning, Pittsburgh, PA., 2006.
Angelova, R. et al., "Graph-based Text Classification: Learn From Your Neighbors", SIGIR '06, Aug. 2006, Seattle, USA, pp. 485-492.
Chakrabarti, S. et al., "Enhanced Hypertext Classification Using Hyper-Links", In Proceedings of ACM SIGMOD Conference, 1998, pp. 307-318.
Neville, J. et al., "Iterative Classification in Relational Data", In Proc. AAAI-2000 Workshop on Learning Statistical Models from Relational Data, 2000, pp. 42-49.
Taskar, B. et al., "Probabilistic Classification and Clustering in Relational Data", In Proc. 17th Internabonal Joint Conference on Artificial Intelligence, 2001, pp. 870-878, 2001.
Lu, Q. et al., "Link-based Classification", Proceedings of the Twentieth international conference on machine learning (ICML-2003), Washington D.C., 2003, pp. 496-503.
Neville, J. et al., "Dependency Networks for Relational Data", Proceedings of the Fourth IEEE International Conference on Data Mining (ICDM'04), Nov. 2004, pp. 170-177, Brighton, UK.
Rennie, J.D.M. et al., "Tackling the poor assumptions of naive bayes text classifiers", In Proceedings of the Twentieth International Conference on Machine Learning, 2003.
McCallum, A.K. et al., "A comparison of event models for naive bayes text classification", in Working Notes of the ICMLAAAI Workshop on Learning for Text Categorization, 1998.
Eyheramendy, S. et al., "On the naive Bayes model for text categorization" In Proceedings of AISTATS 2003, 9th International Workshop on Artificial Intelligence and Statistics, 2003.
Kontostathis, A. et al., "A Framework for Understanding LSI Performance", Information Processing & Management, vol. 42, No. 1, 2006, pp. 56-73.
Deerwester, S. et al., "Indexing by latent semantic analysis", Journal of the American Society for Information Science, vol. 41, No. 6, 1990, pp. 391-407.
Ganiz, M. et al., "Link Analysis of Higher-Order Paths in Supervised Learning Datasets", In the Proceedings of the Workshop on Link Analysis, Counterterrorism and Security, 2006 SIAM Conference on Data Mining, Bethesda, MD., Apr. 2006.
Ganiz M. et al., "Detection of Interdomain Routing Anomalies Based on Higher-Order Path Analysis", Proceedings of the Sixth IEEE International Conference on Data Mining (ICDM'06), Dec. 2006, Hong Kong, China.
Edmonds, P., "Choosing the word most typical in context using a lexical co-occurrence network", In Proceedings of the Thirty-fifth Annual Meeting of the Association for Computational Linguistics, 1997, pp. 507-509.
Zhang, X. et al., "Level search schemes for information filtering and retrieval", Information Processing and Management, vol. 37, No. 2, 2000, pp. 313-334.
Schutze, H., "Automatic Word Sense Discrimination", Computational Linguistics, vol. 24, No. 1, 1998, pp. 97-124.
Xu, J. et al., "Corpus-Based Stemming Using Co-Occurrence of Word Variants", ACM Transactions on Information Systems, vol. 16, No. 1, 1998, pp. 61-81.
Uno, T., "An Output Linear Time Algorithm for Enumerating Chordless Cycles", 92nd SIGAL of Information Processing Society Japan, 2003, pp. 47-53.
Uno, T., "Algorithms for Enumerating All Perfect, Maximum and Maximal Matchings in Bipartite Graphs", Lecture Notes in Computer Science, vol. 1350. Proceedings of the 8th International Symposium on Algorithms and Computation, 1997, pp. 92-101, ISBN: 3-540-63890-3, Springer-Verlag, London, UK.
McCallum, A.K. et al., "Automating the construction of internet portals with machine learning", Information Retrieval, vol. 3, 2000, pp. 127-163.
Giles, C.L. et al., "CiteSeer: An automatic citation indexing system", ACM Digital Libraries 98, 1998, Third ACM Conference on Digital Libraries, Ed. Witten, I. et al., ACM Press, New York, pp. 89-98.
Sen, P. et al., "Link-based Classification", University of Maryland Technical Report, No. CS-TR-4858, Feb. 2007.
Sarawagi, S. et al., "Cross-Training: Learning Probabilistic Mappings Between Topics", SIGKDD '03, 2003, Washington, DC, USA.
"Vimeo" by Internet Archive WayBackMachine, dated from Jun. 2, 2007, pp. 1-6.
Office Action issued in connection with U.S. Appl. No. 12/317,152 mailed Jun. 22, 2011.
Official Action issued in connection with U.S. Appl. No. 12/317,152 mailed Dec. 21, 2010.
Official Action issued in connection with U.S. Appl. No. 12/317,153 mailed Sep. 28, 2010.
Official Action issued in connection with U.S. Appl. No. 12/317,152, mailed Nov. 10, 2011.

* cited by examiner

FIG. 1
High-Level Logical Diagram

FIG. 3
Software Stack Diagram

Layer Structure of Client Software Components

FIG. 4
Indexing Module Diagram

FIG. 5
P2P Module Diagram

FIG. 6
Flowchart of Indexing Operation

FIG. 7
Example of extracting/enumerating higher-order paths from a co-occurrence graph FIG. 8
Cross-training Procedure

PEER-TO-PEER INDEXING-BASED MARKETPLACE

CROSS-REFERENCE TO RELATED APPLICATIONS

This application claims the benefit of provisional patent application Ser. No. 61/008,405, filed 2007 Dec. 20 by the present inventor.

The technology described in this patent relies on other patent-pending technologies, especially that described in "System for Content-Based Peer-to-Peer Indexing of Data on a Networked Storage Device", filed by Intuidex Inc. The technologies described in this patent also overlap with other patent-pending technologies, including that described in, and "Social Networking on a Website with Topic-Based Data Sharing", also filed by Intuidex Inc.

BACKGROUND AND FIELD OF THE INVENTION

This application relates to the field of computer networking and techniques for providing more intuitive access to data stored on a network, and new provisions for the economics of access to indexed data.

PRIOR ART

The invention improves on the prior art by means of higher-order algorithms which provide an intuitive topic space, as well as peer-to-peer network software which handles marketplace applications more efficiently by differentiating topic index data from other types of data.

LIST OF DRAWINGS

1. Logical module diagram, showing the software and hardware modules at a high level
2. Home network example embodiment
3. Software "stack" diagram (Siemens Layer Diagram)
4. Indexing software module diagram
5. Peer-to-peer software module diagram
6. Flowchart of writing data to disk, indexing, and sharing
7. Example of extracting/enumerating higher-order paths from a co-occurrence graph
8. Cross-training Procedure

SUMMARY OF THE INVENTION (GROUPWARE) The substrate of the invention consists of a variable number of digital devices attached to a network, with each device running software that performs indexing of data stored on the devices, generates topic-based indexes, and provides topic-based and metadata-based search capability via the indexes. The software running on each device also includes a peer-to-peer protocol which forms a peer-to-peer network of the devices. The peer-to-peer protocol is specifically designed to use the output of the indexing module to provide distributed indexing and search. The peer-to-peer software also provides complete facilities for user-level and group-level authentication and security, including permissions based on the topics generated by the indexing software. Depending on the role of the device, each device may or may not also have a (invention also consists of) user interface tailored to the capability of the device and allowing access to sharing, search, and other functions of the network.

The software and hardware making up this index-centered peer-to-peer network provide for a number of data sharing and community-based applications. Specifically, 'Communities of Interest' can form automatically based on topics, including communities with an economic component. This patent covers in particular the creation of such an index-based marketplace, and describes embodiments related to a home networking environment.

BRIEF DESCRIPTION OF THE DRAWINGS

Drawing 1 is a high-level logical diagram depicting the main functional modules of the system. This diagram does not describe the embodiment of any of these modules.

Drawing 2 is a diagram of a home network configuration, illustrating one of the most extensive embodiments of the system. Various home electronics and home control devices are shown communicating intelligently by means of the network's indexing and P2P capabilities.

Drawing 3 is a vertically-oriented layer diagram showing the entire software stack employed by the system, from high- to low-level. This diagram provides an enumeration of all the software modules used in the system, as well as the major interfaces between them. Any vertical adjacency in this diagram corresponds to an interfaces between software components. Each of these interfaces is described below in the detailed description of the preferred embodiment.

Drawings 4 and 5 show further decompositions of the two main software modules. Drawing 4 indicates the internal structure of the indexing software module, and Drawing 5 indicates the internal structure of the Peer-to-Peer software Module.

Drawing 6 is a flowchart showing the procedure for the operation of indexing new data.

Drawing 7 summarizes the process of extracting and enumerating higher-order paths from a co-occurrence graph.

Drawing 8 summarizes the machine learning procedure known as co-training, described below.

DETAILED DESCRIPTION OF THE INVENTION

Preferred Embodiment

From the perspective of the peer-to-peer network, each connected device along with its software composes one "peer". There are two kinds of peers in the network, referred to as "Client Peers" and "Server Peers". The only difference between a client peer and a server peer is at the level of the peer-to-peer communications module of the software. The server peer has additional low-level capabilities that allow the server peer to take a larger role in managing the flow of data in the network. The server peer may or may not be used to provide the same end-user functionality as a client.

Figure 3:
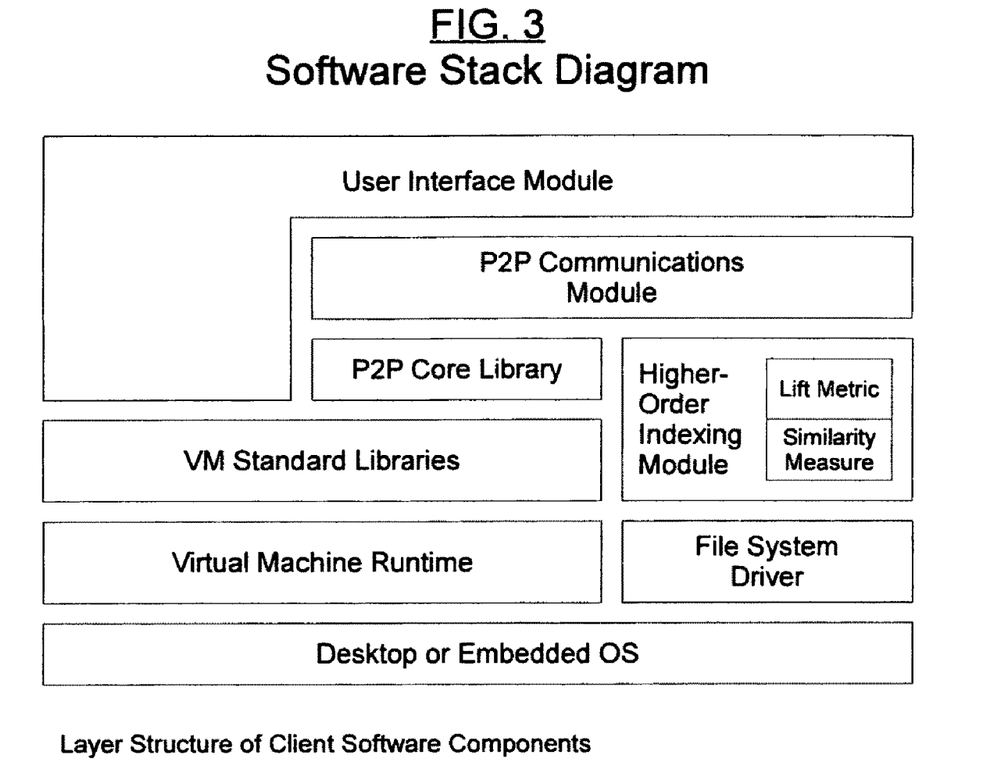
Figure 4:
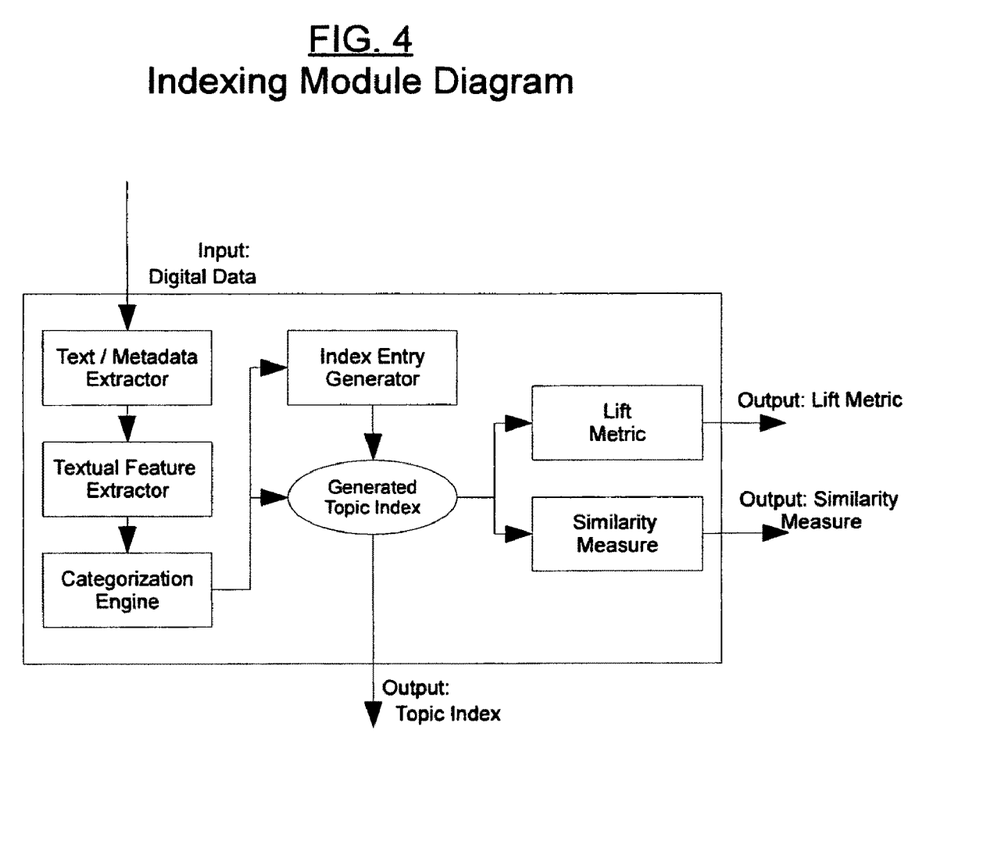
Figure 5:
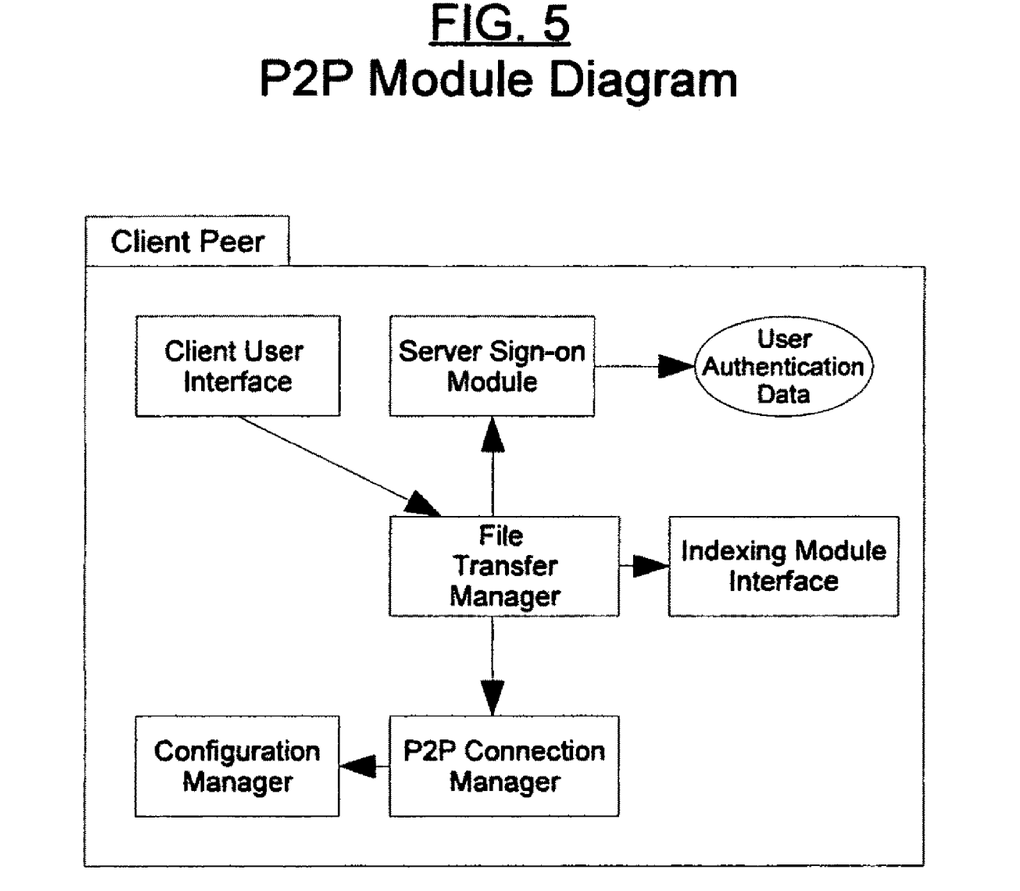
Figure 6:
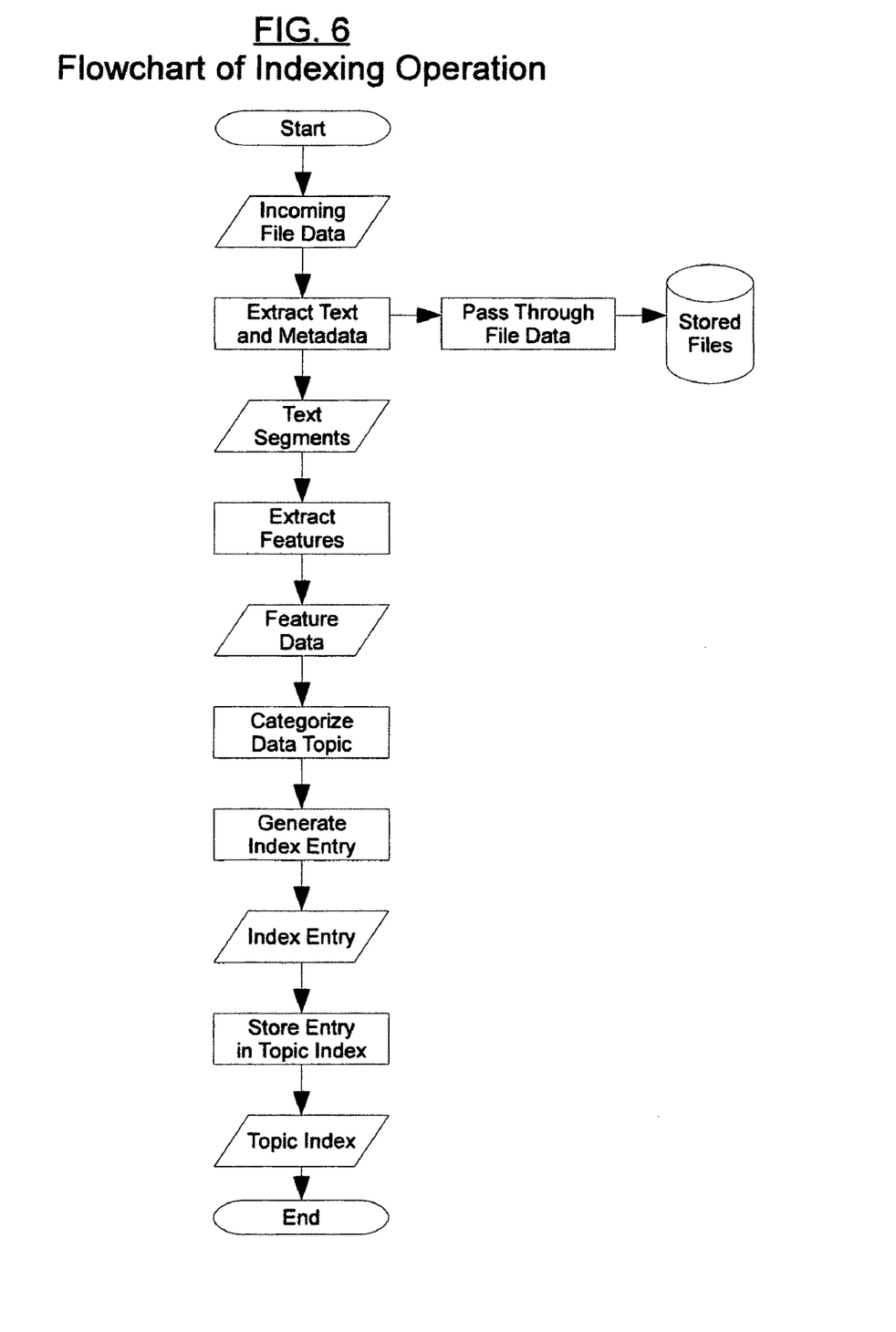

Following is a description of each of the components of the network software suite and their interconnections. Drawing 3 shows the allowable interfaces between software components, which are described beginning in item 005.

[001 Description of Indexing Software]

The function of the indexing module is to examine data files and create an index of those data files by topic. The topic should be an accurate classification of the contents of the data file within the range of a pre-existing set of topic categories. There are several methods for examining the data that is to be written to the disk. In one embodiment of the indexing software, files are examined for data in the form of plain text, and then that text is extracted and used to determine a topic using algorithms from the data mining field.

One such state-of-the-art classification method is implemented, which receives additional input from the system's user interface. Upon installation of the system, the system scans the data files that the user wishes to share, randomly selects a sample of the files, and prompts the user to input the correct topic of those files. This sample of user-labeled data is referred to in the field of statistical machine learning as the "training set." An algorithm known as the "training algorithm" uses the user-labeled data as its training set, and generates a second algorithm, called the "classification rule", for automatically classifying data that will be written to the disk in the future. The combination of training algorithm and classification rule make up our classification method. Typically they are not referred to independently, but as one Statistical Machine Learning algorithm.

The classification method used for this invention falls in the realm of Statistical Machine Learning algorithms, yet includes key advancements in the field. Statistical machine learning algorithms operate on flat data and traditionally assume that instances are independent and identically distributed (IID). However, this context-free approach does not exploit the available information about relationships between instances in the dataset [4]. In link mining, a subset of the field of statistical relational learning, algorithms operate on relational data that includes explicit links between instances. These relations provide rich information that can be used to improve classification accuracy of learned models, since attributes of linked instances are often correlated, and links are more likely to exist between instances that have some commonality. Given a set of test instances, relational models simultaneously label all instances in order to exploit the correlations between class labels of related instances. This is also known as collective classification (or collective inference), and violates the traditional independence assumption. Several studies (e.g., [5], [6], [7]) have shown, however, that by making inferences about multiple data instances simultaneously, collective inference can significantly reduce classification error [9].

The base classification algorithm used by the invention is the well-known Naïve Bayes algorithm. Naïve Bayes is commonly used in text classification because it executes quickly [10]. The Naïve Bayes classifier is the simplest of Bayesian classifiers in that it assumes that all attributes of the examples are independent of each other given the context of the class. Although this assumption does not hold for most real-world datasets, overall Naïve Bayes performs fairly well. Traditional (or first-order) Naïve Bayes uses documents as instances and words as the attributes. This maps directly to the method of our invention, in that the data files written to the hard disk are the documents, and the textual contents of those files, consisting either of words or of character n-grams, are the attributes.

To use the Naïve Bayes algorithm with a set of documents, first an ordered set of attributes (words or n-grams) is selected (commonly the union of all words found in a corpus of documents.) The documents are then used to create a set of training vectors, one vector for each document. The length of the vectors is equal to the size of the set of entities used in the classification process, and each coordinate t of the vector is either 1 or 0 indicating whether that word is present in the document. To each vector is appended its class C, representing the true class label of this document.

The training process for Naïve Bayes is at heart a probabilistic calculation using the well-known Bayes' rule. Based on the training vectors, the following set of empirical probabilities can be calculated:

$$P(t|C) = (\# \text{ of documents in class } C \text{ including word } t)/(\# \text{ of documents in class } C) \quad (1)$$

$$P(C) = (\# \text{ of documents in class } C)/(\text{total } \# \text{ of documents}) \quad (2)$$

The training algorithm consists entirely of computing these quantities from the given vectors. After these probabilities are calculated, Bayes' rule gives us a rule for calculating the probability that any future encountered document d belongs to class C:

$$P(C|d) = P(d|C)P(C) \quad (3)$$

So to classify any future document, this probability is calculated for all classes, and the label of the class whose probability is highest is selected as the correct label.

The training algorithm for this invention has been modified to include the higher-order relational information described above, and thus does not make the independence assumption. In our system, the higher-order information used is in the form of a second-order co-occurrence path.

Explicit links described above can take the form of words or n-grams in common between documents. For example, if two documents share the same term, those two documents have a first-order link to each other. If two documents both have a first-order link to a third document, but not to each other, then that is a second-order link, and so on. The highest order of links to be used in the training process is fixed beforehand. The preferred embodiment of this invention uses a second-order model.

In the higher-order algorithm, the form of the training set used is identical to that of traditional Naive Bayes. However, a different set of empirical probabilities is calculated, as follows:

$$P\_(t|C) = (\# \text{ of higher-order paths in class } C \text{ including word } t)/(\# \text{ of higher-order paths in class } C) \quad (4)$$

$$P(C) = (\# \text{ of higher-order paths in class } C)/(\text{total } \# \text{ of higher-order paths}) \quad (5)$$

The rest of the calculations and the inference process are the same as traditional (first-order) Naive Bayes. Though the training algorithm considers higher-order information, after the training phase is complete the classification is still done with single data instances. In other words, after (4) and (5) are calculated from the training set, it is possible to compute (3) with a single document in order to perform the classification. This is a significant advantage as it allows data files to he classified one-by-one, in real time, as they are written to the hard disk.

Computing the higher-order statistics used for the training process requires enumeration of all the second-order co-occurrence paths. This can be done using methods of graph theory. Our definition of a higher-order path is akin to that found in graph theory, which states that given a non-empty graph $G=(V, E)$ of the form $V=\{x_0, x_1, \ldots, x_k\}$, $E=\{(x_0x_1, x_1x_2, \ldots, x_{k-1}x_k\}$ with nodes $x_i$ distinct, two vertices $x_j$ and $x_k$ are linked by a path P where the number of edges in P is its length. Such a path is often referred to by the natural sequence of its vertices $x_0x_1 \ldots x_k$. [6]. Our definition differs from this in a couple of respects, however. First, vertices $V=\{e_0, e_1, \ldots, e_k\}$ represent entities, and edges $E=\{r_0, r_1, \ldots, r_m\}$ represents records, documents or instances. Several edges may exist between given entities. Finally and most importantly, in a higher-order path both vertices and edges must be distinct.

Co-occurrence relations in a record or instance set can be represented as an undirected graph G=(V, E) such that V is a finite set of vertices (i.e., entities) and E is the set of edges representing co-occurrence relations. In other words, if two entities co-occur in a record then there is an edge between the corresponding vertices and this edge is labeled with the records(s) in which they co-occur. It is not straightforward, however, to depict higher-order paths with conventional graph structures because multiple paths may connect two given entities: for example, $e_1$-$r_1$-$e_2$ and $e_1$-$r_2$-$e_2$ are both valid paths between entities $e_1$ and $e_2$. A conventional graph can nonetheless be modified to represent paths of this nature by maintaining a data structure that contains lists of records for each edge. We term this a path group. Path groups are extracted directly from the co-occurrence graph G. Using this representation, the higher-order paths correspond to a complete matching in the bipartite graph formed from the set of entities and the set of lists of records. Likewise, higher-order paths defined in this manner are the system of distinct representatives of the sets of records for each edge.

Extracting/Enumerating Higher-Order Paths from a Co-Occurrence Graph

Figure 7:
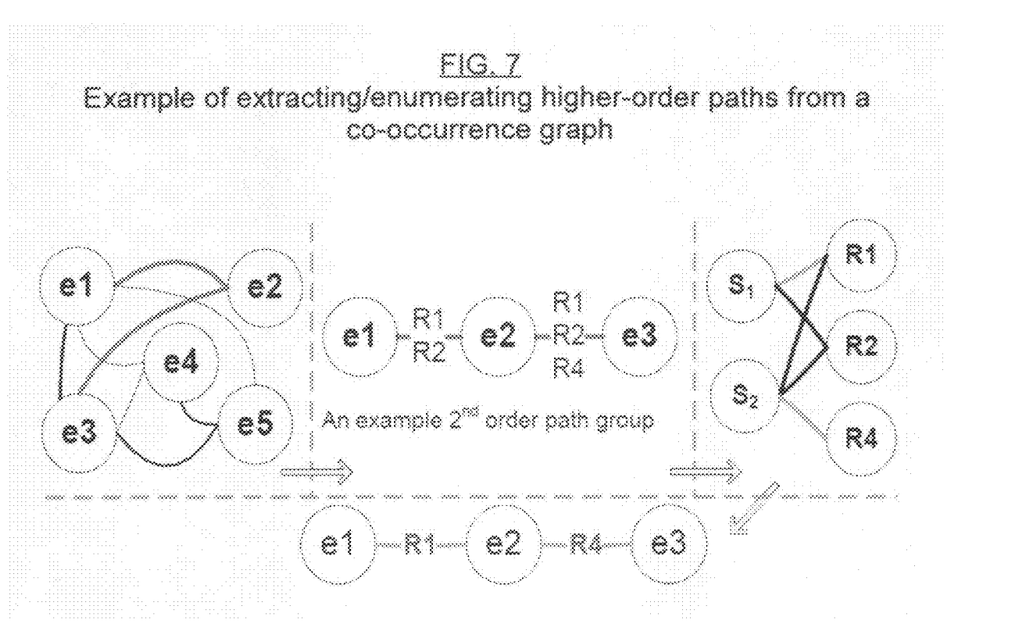

Using the path group representation, we need to identify the systems of distinct representatives (SDRs) of the record sets. Each distinct representative in the path group satisfies the second requirement (i.e., edges must be unique) and corresponds to a higher order path. In order to enumerate all the distinct representatives in a given path group, a bipartite graph $G_b=(V_1 \cup V_2, E)$ is formed such that $V_1$ is the sets of records $(S_1, S_2, \ldots)$ in a given path group and $V_2$ is the records themselves. A maximum matching with cardinality $|V_1|$ in this bipartite graph yields the SDR for the higher order path. This process is summarized in in-line Drawing 7. In Drawing 7, we can see an example second-order path group ($e_1$-$\{1,2\}$-$e_2$-$\{1,2,4\}$-$e_3$) that is extracted from the co-occurrence graph $G_x$. This particular second order path group includes two sets of records: $S_1=\{1,2\}$ and $S_2=\{1,2,4\}$. $S_1$ corresponds to the records in which $e_1$ and $e_2$ co-occur, and $S_2$ is the set of records in which $e_2$ and $e_3$ co-occur. A bipartite graph $G_b=(V_1 \cup V_2, E)$ is formed where $V_1$ is the two sets of records and $V_2$ is the all records in these sets. Enumerating all maximum matchings in this graph yields all higher-order paths in the path group. The fourth diagram (depicted in Drawing 7) shows an example of one of the many paths in this path group. In this higher-order path, edge labels $R_1$ and $R_4$ are records in $S_1$ and $S_2$ and the path corresponds to the orange-colored maximum matching in the bipartite graph.

In lieu of enumerating all maximum matchings to find the SDRs, in prior work [16] we also developed the following closed-forms for enumerating second- and third-order paths in path groups based on the inclusion-exclusion [24] principle:

$$N_{-2} = |A||B| - |A \cap B| \quad (10)$$

$$N_{-3} = |A||B||C| - (|A \cap B||C| + |A \cap C||B| + |B \cap C||A|) + 2|A \cap B \cap C| \quad (11)$$

$$N_{-4} = |A||B||C||D| - (|A \cap B||C||D| + |A \cap C||B||D| + |A \cap D||B||C| + |B \cap C||A||D| + |B \cap D||A||C| + |C \cap D||A||B|) + (|A \cap B||C \cap D| + |A \cap C||B \cap D| + |A \cap D||B \cap C|) + 2(|A \cap B \cap C||D| + |A \cap B \cap D||C| + |A \cap C \cap D||B| + |B \cap C \cap D||A|) - 6(|A \cap B \cap C \cap D|) \quad (12)$$

Here the letters A, B and C represent sets of records for each edge in a third-order path group (e.g., $e_1$-$\{2,3,4\}$-$e_2$-$\{1,3,5\}$-$e_3$-$\{2,3,5\}$-$e_4$, A=$\{2,3,4\}$, B=$\{1,3,5\}$, C=$\{2,3,5\}$).

Although our application is not completely analogous to the enumeration of sets using the inclusion-exclusion principle, we were able to successfully develop these three closed-forms using inclusion-exclusion as a starting point. When fourth order does not suffice we rely on our iterative approach to enumeration using bipartite graphs.

This approach, known as "Higher-order Naïve Bayes", has been shown to significantly improve the classification performance when the training set is small. Therefore this algorithm is ideal for producing an accurate topic-indexing system while keeping the amount of manual classification required by the user to a minimum.

The output of the categorization algorithm is an index that is partitioned into subsections called 'topic indexes', with one topic index containing all entries that correspond to a particular topic. In addition, each topic index contains a representation of the classifier generated by the higher-order training algorithm, allowing anyone possessing a copy of the index to determine whether new data matches the index's topic. As data is added to each topic index, a 'lift' metric is computed to measure the density and quality of data in the topic index. The data in the topic indexes facilitate the advanced searching and recommendation features of the system.

[002 Description of Cross-Training-Based Methods for Index Comparison and Merging]

Document classification is a well-established technology for assigning categories from an existing taxonomy to documents. However, there is currently no single universal set of categories that can be used to classify data, and we do not expect one to arise in the near future. Furthermore, much content is generated without regard to any taxonomy whatsoever. This is certainly the case for the user-generated topics generated by the invention.

Figure 8:
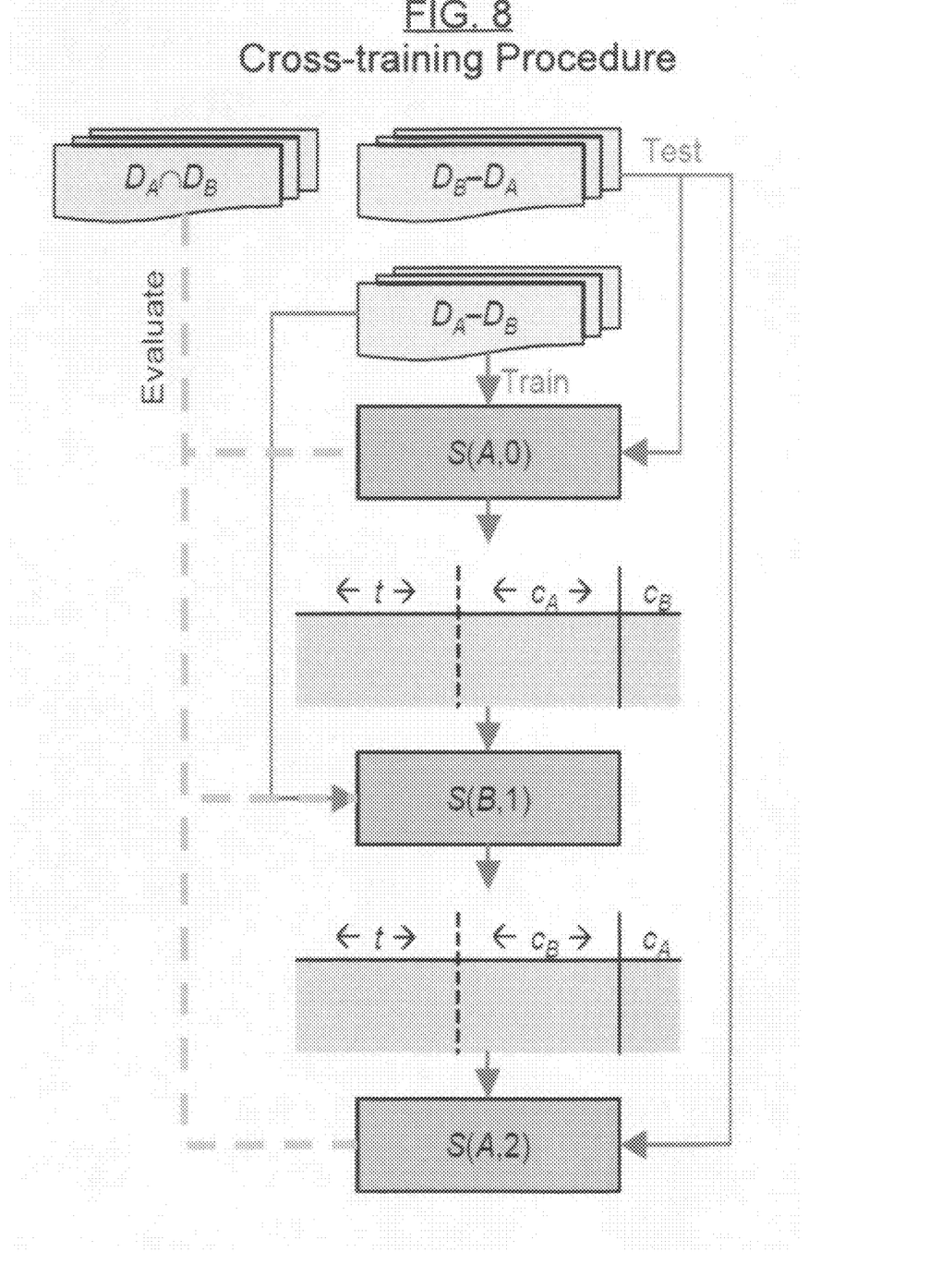

However, it has been shown that a semi-supervised learning technique known as cross-training can discover and exploit probabilistic relations between two taxonomies for more accurate classification [23]. Sarawagi et al. [23] point out that "Cross-training is related to multi-task learning or life-long learning, in which information (features, models, etc.) from one learning task is used for another." The basic idea is to leverage the class label(s) from one training set as attributes which are used in training a classifier on a second training set. The predictions that result are then factored into the final model built on the first set. Drawing 8, which is drawn from Sarawagi et al. [23], depicts this scenario.

At first glance the approach seems similar to the co-training technique of Blum and Mitchell (1998) because both approaches involve a pair of learners. In co-training, however, the models are built from disjoint sets of attributes whereas in cross-training the models depend on a single shared dictionary of attributes. Essentially, cross-training is a paradigm in which two independent classifiers learn to classify each others' training sets. This results in increased performance of both classifiers as well as a way to measure the similarity of the classes that have been learned.

The invention makes use of cross training as a means for matching indexes. Cross-training is run on two topic indexes to generate a measure of similarity of the topics represented by those topic indexes. A high similarity measure for two topics may cause the groupware to suggest a topic merge, in which the two topic indexes' entries are combined into one and a new classifier is generated for the combined index data using the training algorithm.

The invention also makes use of cross-training for computing the 'lift' of topic indexes as a means of measuring the information quality. Cross-training is run on a user-generated index as well as a pre-generated index containing a topic of known value.

[003 Description of Peer-to-Peer Software and Protocol]

Peer-to-peer (P2P) technology refers to a system that manages network-distributed resources to perform data sharing and communications functions in a decentralized manner. The invention contains a customized software implementation of a peer-to-peer protocol that serves to automatically share the contents of the hard disk on a network to which other instances of the invention are connected. The peer-to-peer software is also customized to share the index data generated by the indexing software component. Through the peer-to-peer software component, the invention acts as one node, or peer, on a large network of compatible devices.

The peer-to-peer component works by first registering the device on the network with a unique generated ID number. It contacts a server peer (see item 004) and registers its ID with a username and password supplied by the user of the system. If the authentication process succeeds, the client will be able to continue by requesting the IDs of peers that are in the same peer group.

The peer-to-peer software performs authentication and access control by means of user groups. The groups in the peer-to-peer network form a hierarchical structure. At the lowest level, a group is created for each individual user who is registered in the system. This provides each user full search, read, and write access to his or her own data from any remote location. At the next level there are "user groups" which are created by users and can be joined by an arbitrary number of other users. Such groups may have open membership (anyone who desires may join), or be invitation-only, by means of a digital certificate. A single user may be a member of any number of such groups. By default, these groups offer read-only data access to the members of the group. At the highest level there is the "world" group, consisting of all users of the system on any reachable network.

The underlying mechanics of the peer-to-peer protocol perform discovery and routing functions that allow any type of data to be distributed between peers on the network without recourse to a centralized server. The peer-to-peer software incorporates advanced techniques for providing access to networked resources which are located behind firewalls or Network Address Translation (NAT) routers.

[004 Description of Server Peer Peer-to-Peer Functions]

A server peer is any device on the network whose peer-to-peer software module includes additional functionality related to data transport, discovery and routing on the peer-to-peer network. Server peers increase the reliability, flexibility, and self-healing properties of the peer-to-peer network. The Server Peers can also act as relays to peers lying behind firewalls or NAT routers.

[005 Indexing to Peer-to-Peer Software Interface]

The peer-to-peer software component is integrated with the indexing component in a novel way. The most significant feature of the integration of the peer-to-peer software with indexing is index sharing. Topic indexes are shared transparently on the network, according to the demands of end-user applications and the permissions that users specify for their topic indexes. The permissions of each topic index can be set independently of the data itself and independently of other topic indexes. The user of the system can select which of their topic indexes are shared with which groups. In this way the user chooses by topic which subsets of their data are shared, rather than by file location as is typical in file-sharing applications.

Furthermore, the peer-to-peer software is designed to treat index data that is transferred over the network differently from other types of data. Each of the "packets" (transmission units) of data transferred by the peer-to-peer protocol contain a predefined set of signature bytes that identify them as either index data or regular data. If a peer node that is used to transfer data between two other hosts sees index data in the packets it is transferring, and it has permission to read the index, it will add that index data to its own index even though the node is not the original destination for the index data. In this way the distributed index of the P2P group's data becomes more complete as the network is utilized.

The sharing of topic indexes provides an efficient peer search method, in which all resources shared by a group can be searched. When the user performs a search of a group to which he or she has search access, the indexes of that group are downloaded to the user transparently through the peer-to-peer network. This is much more efficient and robust than either attempting to discover and search all shared data on the network, or maintaining a centralized index.

The groupware will also automatically perform cross-training-based topic matching (see above) for topic indexes received through the P2P network, so that users who have generated highly similar topics may choose to merge their topics into a single topic.

Through the integration of indexing with peer-to-peer technology, the system automatically provides searching and recommendation of the shared data on the basis of content topics, which is a more advanced and intuitive method of sharing data. Searching is just one sample application that is provided by means of topic index sharing; the capability of sharing and merging topic indexes while protecting access to the data itself provides for multiple advertising and marketplace-based applications, as described below.

[006 HTTP Server]

Any device on the network may contain an implementation in either software or hardware of an IP stack and HTTP server. In this case, the invention provides a website implementation of the graphical user interface, described below. Any device on the network with a web browsing client may access functions of the system, without additional software installation, by accessing the web page interface on a device running the HTTP server.

[007 Graphical User Interface]

The Graphical User Interface software is the primary means of operating the invention. Any device on the network may run an implementation of the Graphical User Interface tailored to the capabilities of the device. All implementations of the Graphical User Interface provide a common set of functions, allowing the user to register a device with a specific username, join various pre-existing groups, select which topic indexes are shared with which groups, to browse the files on their own devices remotely, and to search by topic or metadata on any peers to which the user has access. These are basic interface features and do not limit the scope of applications that can be built on the network; in particular, advanced marketplace applications are described below.

[008 P2P (Peer-to-peer) Backup Application Software]

The system also contains software which performs automated backups of data shared in the P2P network to which it is attached. The backup functionality is a use case of the P2P network's provided functionality, and so the backup software should be considered to reside at the application level.

Any indexed shared data can be tagged for backup. A user can set backup tags for his or her data by folder, by index topic, or by individual file. This tag becomes part of the index of the user's data. When the backup software is run, it retrieves all indexes in the network group and searches the index for all files tagged for backup. All tagged files are downloaded from the network and stored in a special backup archive on the hard drive. The backup archive preserves the device ID and the directory location of each backup file so that a complete restoration can be performed.

Any device on the network used as a backup device would require significant storage capacity, making dedicated servers or intelligent networked hard disks the obvious choices for backup devices.

Operation of Invention

Preferred Embodiment

In the preferred embodiment, a software package containing the described features of the invention is installed on a computing device. The user then runs the software and selects which drives and folders should be searched for data to be indexed, as well as which index categories he or she wishes to use in classifying his or her data. After a brief scan of the drives, the user is asked to manually label the topic category of a small number of randomly selected data files from those to be indexed. This gives the topic classification functionality a high level of accuracy, using the sparse-data supervised learning algorithm described above. At this point the following marketplace operation can occur.

[009 Index Marketplace]

The indexing system sets a value on a topic index based on the amount of preference data that has been stored in it. Users will be able to sell this index or exchange it for services. For example, an advertiser service provider may provide the option for a user to exchange user topic indexes with sufficient 'lift' for cash or premium content. Advertisements relevant to the topic indexes sold will then be displayed on the network.

In this way a rich marketplace of topic indexes can be created. Another scenario is where multiple advertising-based service providers may provide "bids" for indexes; the home user can then select which provider to sell which of their topic indexes to, based on which offer is more appealing.

DESCRIPTION AND OPERATION OF ALTERNATIVE EMBODIMENTS

Figure 1:
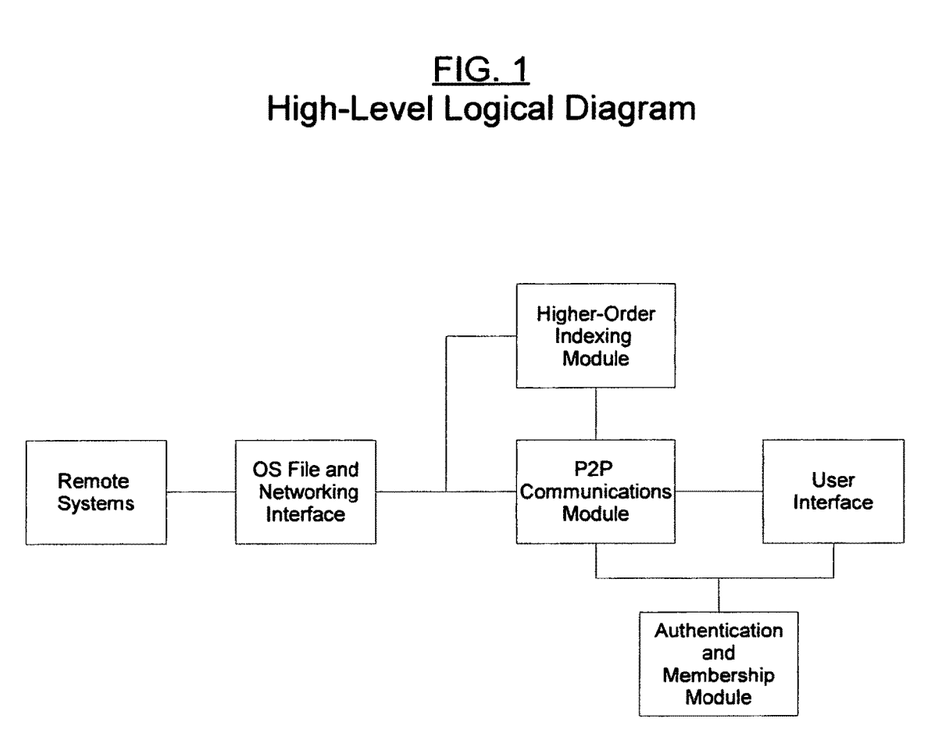
Figure 2:
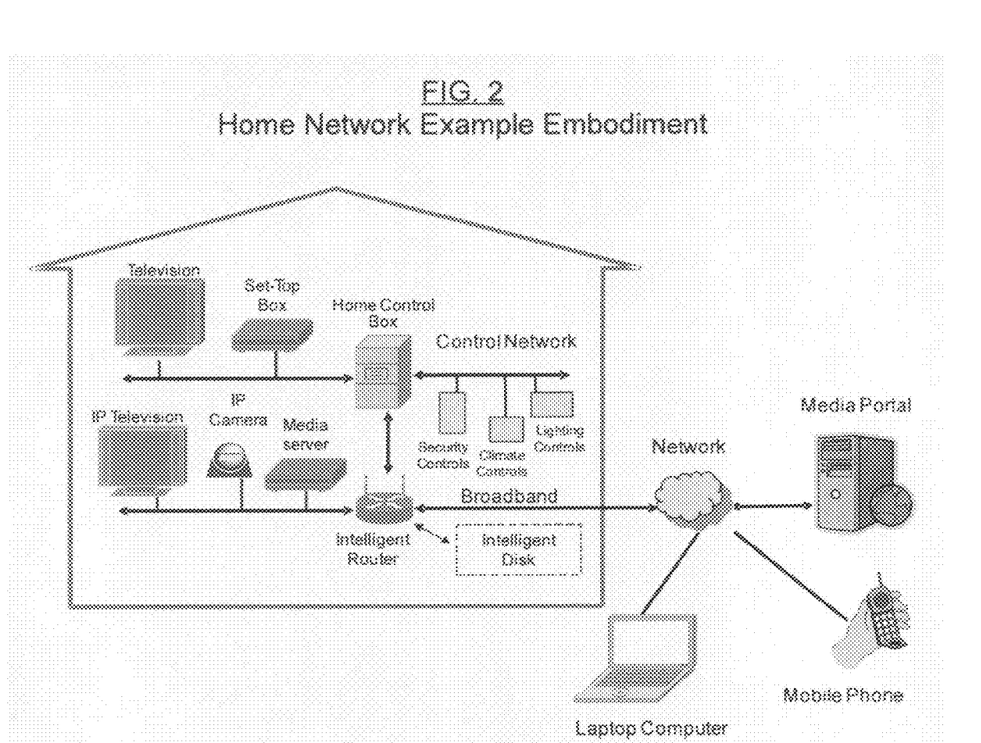

The following operations of the system are described in terms of an alternative embodiment as a network in a home or residence. Drawing 2 is a diagram of a sample home network in which the system would find extensive use.

All the following devices shown in the diagram may run the software portion of the invention in order to function as a node in the network marketplace: an IP-enabled television set, a set-top recording box, a networked media server, an IP router, a home control device, a media portal computer, and a smart phone. Following is a description of a few of the possible use cases of the system on such a network.

[010 Device-Independent Topic-Based Search and View of Home Media]

Perhaps the most straightforward application of this peer-to-peer indexing marketplace is ubiquitous indexed access to home media. For example, photographs taken on a digital camera and uploaded to a PC on which the indexing software is run could then be searched from any device on the network, for example a mobile phone, and downloaded to the device at any time. In this way the promise of universal access to home media begins to be realized.

[011 Backup of Home Media by Topic]

In this scenario, using any of the home networking devices, a user selects an index topic for backup and a backup device is chosen, and the P2P software will perform a backup of all data on the home network relevant to that topic on a regular schedule (the operation of the P2P backup feature is described in section 008 above.)

For example, all data marked "financial" on any device could be backed up to a central location, providing safe storage of all important financial documents, regardless of which device they were originally stored on, without having to manually search and select files or folders.

[012 Storage of Home Security Data]

Another feature of the home network shown in Drawing 2 is a home control box connected to a control network of intruder alarms and security cameras, and lighting control devices. The P2P and indexing software can provide for the automatic backup and search of home security data, so that records of unusual events can be searched, reviewed, and if necessary provided to law enforcement agencies.

While the above descriptions contain many specificities, these should not be construed as limitations on the scope of the invention, but rather as an exemplification of one preferred embodiment thereof. Many other variations are possible, and in particular the scope of the invention is not limited by, for example, the type of digital devices used, or the hardware platforms or operating systems on which the software is run, and the context of the network and its configuration. Accordingly, the scope of the invention should be determined not by the embodiments illustrated, but by the appended claims and their legal equivalents.

[17] M. Ganiz, W. M. Pottenger, S. Kanitkar, M. C. Chuah, Detection of Interdomain Routing Anomalies Based on Higher-Order Path Analysis. Proceedings of the Sixth IEEE International Conference on Data Mining (ICDM'06), December 2006, Hong Kong, China

[18] P. Edmonds, Choosing the word most typical in context using a lexical co-occurrence network. In Proceedings of the Thirty-fifth Annual Meeting of the Association for Computational Linguistics, 1997, pp. 507-509.

[19] X. Zhang, M. Berry, P. Raghavan, Level search schemes for information filtering and retrieval. Information Processing and Management 37 (2), 2000, pp. 313-334.

[20] H. Schütze, Automatic Word Sense Discrimination. Computational Linguistics 24 (1), 1998, pp. 97-124.

[21] J. Xu, W. B. Croft, Corpus-Based Stemming Using Co-Occurrence of Word Variants. ACM Transactions on Information Systems, 16 (1), 1998, pp. 61-81.

[22] T. Uno, An Output Linear Time Algorithm for Enumerating Chordless Cycles, 92nd SIGAL of Information Processing Society Japan, 2003, pp. 47-53.

[23] S. Sarawagi, S. Chakrabarti, and S. Godbole. Cross training: learning probabilistic mappings between topics. Proceedings of the ACM SIGKDD-2003.

[23] T. Uno, Algorithms for Enumerating All Perfect, Maximum and Maximal Matchings in Bipartite Graphs. Lecture Notes in Computer Science, Vol. 1350. Proceedings of the 8th International Symposium on Algorithms and Computation, 1997, pp. 92-101, ISBN: 3-540-63890-3, Springer-Verlag, London, UK

[24] J. H. Van Lint, and R. M. Wilson. A Course in Combinatorics. Cambridge University Press, 1993, ISBN: 0-521-42260-4

[25] A. McCallum, K. Nigam, J. Rennie, K. Seymore, Automating the construction of internet portals with machine learning. Information Retrieval, 3, 2000, pp. 127-163.

[26] C. L. Giles, K. Bollacker, S. Lawrence, CiteSeer: An automatic citation indexing system, ACM Digital Libraries 98, 1998

[27] P. Sen, and L. Getoor, Link-based Classification. University of Maryland Technical Report, Number CS-TR-4858, February 2007

[28] Intuidex Inc., "Peer-to-Peer Indexing-Based Marketplace", provisional patent 61/008,405 filed Dec. 20, 2007.

[29] Intuidex Inc., "System for Content-Based Peer-to-Peer Indexing of Data on a Networked Storage Device", provisional patent 61/008,404 filed Dec. 20, 2007.

[30] Intuidex Inc., "Social Networking on a Website with Topic-Based Data Sharing", provisional patent 61/008,399 filed Dec. 20, 2007.

What is claimed is:

1. A system for classifying data comprising:
a computing device comprising a memory and a processor, the computing device storing on the memory for execution by the processor:
a higher order indexing module configured to:
  (a) perform higher-order indexing to generate a plurality of topic indexes from a pre-selected data set, the higher-order indexing based on relationships between information in the pre-selected data set;
  (b) compute a lift metric on said topic indexes to gauge information content of said topic indexes;
  (c) compute similarity of said topic indexes; and
  (d) classify data received by said higher order indexing module into a topic index in said topic indexes based on the relationships between the information in the pre-selected data set,
wherein the higher-order indexing module calculates probabilities:

$P\_(t|C)$=(# of higher-order paths in class $C$ comprising entity $t$)/(# of higher-order paths in class $C$) and $P(C)$=(# of higher-order paths in class $C$)/(total # of higher-order paths).

2. The software system of claim 1 wherein each topic index comprises a plurality of key elements, a plurality of entry items that link the key elements to source data, and a topic classifier for data.

3. The software system of claim 1 further comprising a plurality of peer-to-peer networking nodes, wherein each node is configured to transmit said topic indexes and any other type of data over a network.

4. The software system of claim 3 further comprising interconnections between said higher order indexing module and said peer-to-peer networking nodes.

5. The software system of claim 1 further comprising a user- and group-based authentication and membership system.

6. The software system of claim 5 wherein the user- and group-based authentication and membership system allows a user to sign in, to join a group, and to specify sharing permissions for said topic indexes.

7. The software system of claim 1 wherein the higher-order indexing module further performs cross-training on the plurality of topic indexes.

8. The software system of claim 1 wherein the higher-order indexing module further calculates a probability that a vector d belongs to class C using:

$P(C|d)=P(d|C)P(C)$.

9. A system for classifying data comprising:
a computing device comprising a memory and a processor, the computing device storing on the memory for execution by the processor:
a higher order indexing module configured to:
  (a) perform higher-order indexing to generate a plurality of topic indexes from a pre-selected data set, the higher-order indexing based on relationships between information in the pre-selected data set;
  (b) compute a lift metric on said topic indexes to gauge information content of said topic indexes;
  (c) compute similarity of said topic indexes; and
  (d) classify data received by said higher order indexing module into a topic index in said topic indexes based on the relationships between the information in the pre-selected data set,
wherein the higher-order indexing module calculates probabilities:

$P\_(t|C)$=(# of higher-order paths in class $C$ comprising entity $t$)/(# of higher-order paths in class $C$) and $P(C)$=(# of higher-order paths in class $C$)/(total # of higher-order paths), and wherein the higher-order indexing module defines higher-order paths using a non-empty graph $G=(V,E)$ of the form $V=\{x_0, x_1, \ldots x_k\}$, $E=\{(x_0, x_1, x_2, \ldots, x_{k-1}x_k\}$ with nodes $x_i$ distinct, two vertices $x_i$ and $x_k$ linked by path P where the number of edges in P is its length, where vertices $V=\{e_0, e_1, \ldots, e_k\}$ represent entities, and edges $E=\{r_0, r_1, \ldots, r_m\}$ represent records, documents, vectors, or instances, and wherein both vertices and edges are distinct.

10. The method of claim 9 wherein the indexing of said data set using higher-order methods further comprises calculating a probability that a vector d belongs to class C using:

$P(C|d)=P(d|C)P(C)$.

11. The software system of claim 9 wherein each topic index comprises a plurality of key elements, a plurality of entry items that link the key elements to source data, and a topic classifier for data.

12. A method for supporting an electronic marketplace for the buying, selling, and general exchange of indexed information, comprising the steps of:
  (a) determining, by a first computing device, a data set;
  (b) indexing, by the first computing device, said data set using higher-order methods to create a plurality of topic indexes;
  (c) generating, by the first computing device, a lift metric of said topic indexes to measure information quality of said topic indexes;
  (d) assigning, by the first computing device, a market valuation to each of said topic indexes based on said lift metric;
  (e) exchanging, by the first computing device, a plurality of said market valuations with a plurality of other computing devices over a network;
  (f) transmitting, by the first computing device, said plurality of topic indexes to at least a second computing device in the plurality of computing devices; and
  (g) after the transmitting, receiving, by the first computing device from the at least a second computing device over the network, one or more of items, currencies, services, and terms of market value, wherein the indexing of said data set using higher-order methods further comprises calculating probabilities:

$$P\_(t|C) = (\text{\# of higher-order paths in class } C \text{ comprising entity } t)/(\text{\# of higher-order paths in class } C)$$
and $$P(C) = (\text{\# of higher-order paths in class } C)/(\text{total \# of higher-order paths})$$

13. The method of claim 12 wherein the indexing of said data set using higher-order methods further comprises cross-training on the plurality of topic indexes.

14. The method of claim 12, further comprising storing in a storage device data stored on different devices and relevant to a particular topic index regardless of which devices the data was originally stored.

15. The method of claim 14 further comprising receiving a request to store data relevant to the particular topic on the storage device.

16. A method for supporting an electronic marketplace for the buying, selling, and general exchange of indexed information, comprising the steps of:
   (a) determining, by a first computing device, a data set;
   (b) indexing, by the first computing device, said data set using higher-order methods to create a plurality of topic indexes;
   (c) generating, by the first computing device, a lift metric of said topic indexes to measure information quality of said topic indexes;
   (d) assigning, by the first computing device, a market valuation to each of said topic indexes based on said lift metric;
   (e) exchanging, by the first computing device, a plurality of said market valuations with a plurality of other computing devices over a network;
   (f) transmitting, by the first computing device, said plurality of topic indexes to at least a second computing device in the plurality of computing devices; and
   (g) after the transmitting, receiving, by the first computing device from the at least a second computing device over the network, one or more of items, currencies, services, and terms of market value,
   wherein the indexing of said data set using higher-order methods further comprises calculating probabilities:

$$P\_(t|C) = (\text{\# of higher-order paths in class } C \text{ comprising entity } t)/(\text{\# of higher-order paths in class } C)$$
and $$P(C) = (\text{\# of higher-order paths in class } C)/(\text{total \# of higher-order paths})$$

wherein the higher-order paths are defined using a non-empty graph $G=(V,E)$ of the form $V=\{x_0, x_1, \ldots, x_k\}$, $E=\{(x_0, x_1, x_2, \ldots, x_{k-1}x_k)\}$ with nodes $x_i$ distinct, two vertices $x_i$ and $x_k$ linked by path P where the number of edges in P is its length, where vertices $V=\{e_0, e_1, \ldots, e_k\}$ represent entities, and edges $E=\{r_0, r_1, \ldots, r_m\}$ represent records, documents, vectors, or instances, and wherein both vertices and edges are distinct.

17. The method of claim 16 wherein the indexing of said data set using higher-order methods further comprises cross-training on the plurality of topic indexes.

18. The method of claim 16, further comprising storing in a storage device data stored on different devices and relevant to a particular topic index regardless of which devices the data was originally stored.

19. The method of claim 18 further comprising receiving a request to store data relevant to the particular topic on the storage device.

* * * * *